US012518823B2

(12) United States Patent
Yang et al.

(10) Patent No.: US 12,518,823 B2
(45) Date of Patent: Jan. 6, 2026

(54) METHOD AND DEVICE FOR IN-MEMORY CUMULATIVE DISTRIBUTION TABLE BASED RANDOM SAMPLER

(71) Applicant: William Marsh Rice University, Houston, TX (US)

(72) Inventors: Kaiyuan Yang, Houston, TX (US); Dai Li, Houston, TX (US)

(73) Assignee: William Marsh Rice University, Houston, TX (US)

( * ) Notice: Subject to any disclaimer, the term of this patent is extended or adjusted under 35 U.S.C. 154(b) by 120 days.

(21) Appl. No.: 18/564,481

(22) PCT Filed: May 31, 2022

(86) PCT No.: PCT/US2022/031570
§ 371 (c)(1),
(2) Date: Nov. 27, 2023

(87) PCT Pub. No.: WO2023/009207
PCT Pub. Date: Feb. 2, 2023

(65) Prior Publication Data
US 2024/0249768 A1 Jul. 25, 2024

Related U.S. Application Data

(60) Provisional application No. 63/195,130, filed on May 31, 2021.

(51) Int. Cl.
*G11C 11/419* (2006.01)
*G11C 15/04* (2006.01)
(52) U.S. Cl.
CPC ............ *G11C 11/419* (2013.01); *G11C 15/04* (2013.01)

(58) Field of Classification Search
CPC .............................. G11C 11/419; G11C 15/04
(Continued)

(56) References Cited

U.S. PATENT DOCUMENTS 5,327,372 A * 7/1994 Oka .................... G06F 12/1027
365/49.1
5,490,102 A * 2/1996 Jubran .................. G11C 15/04
365/49.17
(Continued)

FOREIGN PATENT DOCUMENTS

WO 2021046978 A1 3/2021

OTHER PUBLICATIONS

T. Pöppelmann et al. "Enhanced Lattice-Based Signatures on Reconfigurable Hardware Extended Version" Horst Görtz Institute for IT-Security, Ruhr-University; Bochum, Germany; Feb. 20, 2015 (24 pages).
(Continued)

*Primary Examiner* — Sung Il Cho
(74) *Attorney, Agent, or Firm* — Osha Bergman Watanabe & Burton LLP

(57) ABSTRACT

The present application relates to a method for generating a random sample of an arbitrary distribution. The method includes precomputing a cumulative distribution table (CDT) of the distribution; storing the CDT in an array of range matching content-addressable memory (CAM) cells; inputting data through a search line (SL); comparing the input data against stored data in the CDT using the array of range matching CAM cells; when the input data match the stored data, turning on all pass gates that are controlled by logic gates and shorting a match line (ML) from MSB to LSB; and determining the range matching result on the ML and outputting data points corresponding to an index of the matched row in CDT, when the input data do not match the
(Continued)

stored data, determining an interval of stored data that the input data falls into, and outputting the data points corresponding to the interval.

16 Claims, 18 Drawing Sheets

(58) Field of Classification Search
USPC .................................................... 365/49.17
See application file for complete search history.

(56) References Cited

U.S. PATENT DOCUMENTS

| | | | | |
|---|---|---|---|---|
| 5,712,998 A * | 1/1998 | Rosen | ................ | G06F 12/1027 |
| | | | | 711/205 |
| 6,577,519 B1 | 6/2003 | Avramescu | | |
| 7,257,159 B1 * | 8/2007 | Breeuwer | .............. | H04N 19/18 |
| | | | | 375/E7.157 |
| 8,874,869 B2 * | 10/2014 | Koike | ................ | G06F 12/1027 |
| | | | | 711/207 |
| 11,211,111 B1 * | 12/2021 | Mathur | ............... | G11C 11/4094 |
| 2004/0228156 A1 * | 11/2004 | Huang | .................. | G11C 15/04 |
| | | | | 365/49.1 |

OTHER PUBLICATIONS

International Search Report issued in International Application No. PCT/US2022/031570, mailed Mar. 20, 2023 (3 pages).
Written Opinion issued in International Application No. PCT/US2022/031570; Dated Mar. 20, 2023 (6 pages).

* cited by examiner

| Sampling Method | Latency | Constant Time? | Table Size | Table Lookup | Hardware Friendly |
|---|---|---|---|---|---|
| Rejection | ~8 | No | 0 | 0 | No |
| Bernoulli | ~1.47 | No | $\lambda \log_2(2.4\tau\sigma^2)$ | $\log_2(\sigma)$ | No |
| Knuth-Yao | ~$\log_2(\sqrt{2\pi e}\sigma)$ | No | ~$0.5\sigma\lambda$ | $\log_2(\sqrt{2\pi e}\sigma)$ | Yes |
| Wallace | 1 | Yes | $n\lambda$ | $k\lambda$ | Yes |
| CDT-binary | $\log_2(\tau\sigma)$ | Yes | $\sigma\tau\lambda$ | $\log_2(\tau\sigma)$ | Yes |
| CDT-linear | $\tau\sigma$ | Yes | $\sigma\tau\lambda$ | $\tau\sigma$ | Yes |
| MePLER | 1 | Yes | $\sigma\tau\lambda$ | $\sigma\tau$(parallel) | Yes |

$\sigma$: Variance  $\tau$: Tailcut Factor  $\lambda$: Precision

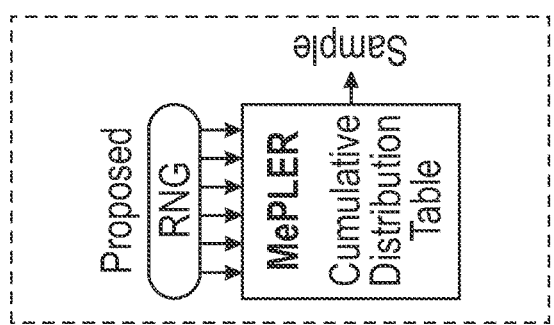

- Constant High Throughput
- Compact Area
- Energy Efficiency

FIG. 2

| | THIS WORK | THIS WORK | ISSCC 19 [1] | CICC 18 [2] | TOC20 20 [8] | TOC18 [7] | TOC18 [6] | TOC18 [6] | TOC19 [5] | DAC19 [9] |
|---|---|---|---|---|---|---|---|---|---|---|
| METHOD | CDT CAM DIFFERENTIAL | CDT CAM SINGLE-END | LINEAR CDT | KNUTH-YAO | KNUTH-YAO | KNUTH-YAO | ZIGGURAT | BINARY CDT | BERNOULLI | KNUTH-YAO |
| TECHNOLOGY | 65NM | 65NM | 40NM | 40NM | FPGA VIRTEX-6 | FPGA VIRTEX-6 | FPGA VIRTEX-6 | FPGA VIRTEX-6 | SOFTWARE AVX2 | SOFTWARE I7-6600U |
| FREQUENCY (MHZ) | 85.9 | 21 | 72 | 300 | 353 | 204 | 60.3 | 297 | - | - |
| THROUGHPUT (MSPS) | 85.9 | 21 | 1.125 | 20 | 353 | 204 | 6.7 | 59.4 | - | - |
| CYCLES/ SAMPLE | 1 | 1 | 64 | 14.9 | 1 | 1 | 9 | 5 | 85 | 2293 |
| ENERGY (PJ/SAMPLE) | 20.6 (SAMPLE) 13.2 (PRNG) | 60.9 (SAMPLE) 13.2 (PRNG) | 2406 | 5078 | - | - | - | - | - | - |
| PRECISION | 64 | 64 | 32 | 256 | 64 | 112 | 64 | 64 | 128 | 64 |
| RANGE | 64 | 64 | 64 | | 82 | 82 | 32 | 32 | 1935 | 32 |
| MEMORY | 0.5KB | 0.5KB | 0.25KB | 65KB | 335 SLICE 1169 LTU 599 FF | 2682 LUT 997 FF | 785 SLICE 563 LTU 785 FF | 43 SLICE 112 LTU 19 FF | 2KB | - |
| AREA (MM²) | 0.034 | 0.026 | ~0.1 | 0.4 | 0.23$^A$ | 1.88$^A$ | 0.55$^A$ | 0.03$^A$ | - | - |
| SCA AWARE | POWER & TIMING | ONLY TIMING | ONLY TIMING | NO | ONLY TIMING | ONLY TIMING | NO | NO | NO | NO | a. Estimated for 65nm Process

FIG. 15

METHOD AND DEVICE FOR IN-MEMORY CUMULATIVE DISTRIBUTION TABLE BASED RANDOM SAMPLER

CROSS-REFERENCE TO RELATED APPLICATION

This International patent application claims priority from U.S. Provisional Application No. 63/149,142, filed on Feb. 12, 2021. The content of this application is hereby incorporated by reference herein in its entirety.

BACKGROUND OF THE INVENTION

Random sampling from an arbitrary distribution is widely required by many computation tasks. Progress in quantum computers has drawn increasing attention on post-quantum cryptography (PQC) and in machine learning, where many schemes require discrete Gaussian sampling as noise source to ensure the security of their schemes. Energy-efficient and high throughput samplers are crucial bottlenecks for these applications. In addition, for security applications, it is desired for the sampler to confine time and power side-channel leakage to thwart attackers.

There are multiple common sampling techniques in both software and hardware. However, there is need of a sampling technique with secure sampling having suppressed timing/power side-channel leakage, high speed, and low cost which can be implemented on a standalone module in form of integrated circuits or chip.

BRIEF SUMMARY OF THE INVENTION

In general, in one aspect, embodiments disclosed herein relate to methods for range matching a random sample for a distribution. The method includes precomputing a cumulative distribution table (CDT) of the distribution; storing the CDT in an array of range matching content-addressable memory (CAM) cells in ascending or descending orders; inputting data through a search line (SL); comparing the input data against stored data in the CDT using the array of range matching CAM cells; when the input data match the stored data, turning on all pass gates that are controlled by logic gates and shorting a match line (ML) from MSB to LSB; and determining the range matching result on the ML and outputting data points corresponding to an index of the matched row in CDT, when the input data do not exactly match the stored data, determining an interval of stored data that the input data falls into, and outputting the data points corresponding to the interval.

In general, in one aspect, embodiments disclosed herein relate to a device for an in-memory cumulative distribution table (CDT) based random sampler. The sample includes an array of content addressable memory (CAM) cells that performs CDT-based random number sampling, a plurality of metal oxide semiconductor field-effect transistors (MOSFETs), a 9-Transistor cell with an additional MOSFET that is controlled by an inverter, wherein the array of CAM cells is configured to perform a range matching for matching search data against stored data.

Other aspects and advantages of one or more embodiments disclosed herein will be apparent from the following description and the appended claims.

BRIEF DESCRIPTION OF THE DRAWINGS

Specific embodiments of the disclosed technology will now be described in detail with reference to the accompanying figures. Like elements in the various figures are denoted by like reference numerals for consistency.

FIG. 2 illustrates a summary of sampling cost in different applications and summary of sampling techniques in accordance with one or more embodiments.

FIG. 15 shows an example of comparison table in accordance with one or more embodiments.

Like elements in the various figures are denoted by like reference numerals for consistency. detailed description of the invention.

DETAILED DESCRIPTION

Figure 1:
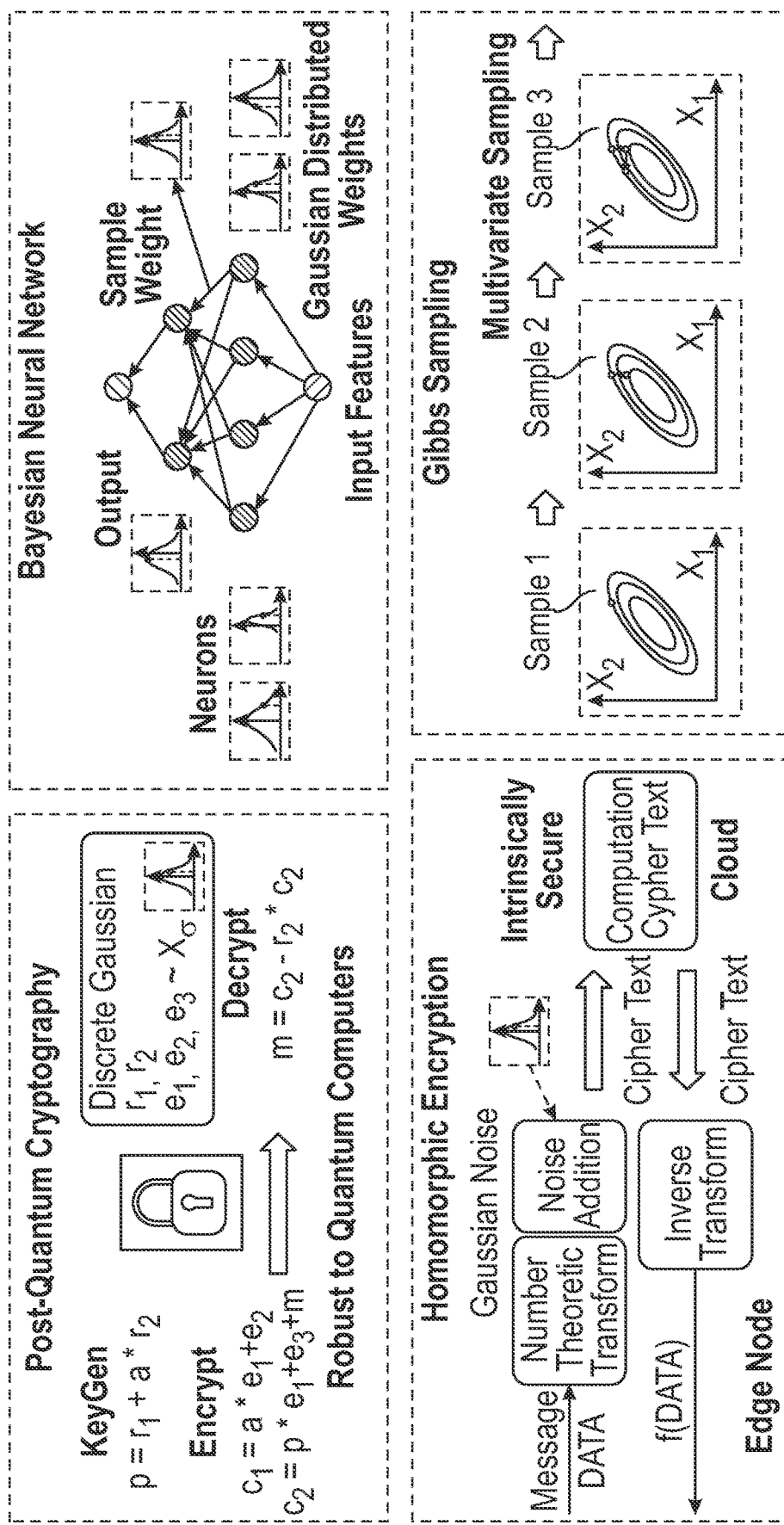
FIG. 1 illustrates applications of random sampling in security and machine learning in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In the following description, any component described with regard to a figure, in various embodiments of the present disclosure, may be equivalent to one or more like-named components described with regard to any other figure.

For brevity, at least a portion of these components are implicitly identified based on various legends. Further, descriptions of these components will not be repeated with regard to each figure. Thus, each and every embodiment of the components of each figure is incorporated by reference and assumed optionally present within every other figure having one or more like-named components. Additionally, in accordance with various embodiments of the present disclosure, any description of the components of a figure is to be interpreted as an optional embodiment, which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

The term "data structure" is understood to refer to a format for storing and organizing data. The term "data" may be used interchangeably with "values" in certain circumstances.

In the following description of FIGS. 1-17, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that one or more of the steps shown in the flowcharts may be omitted, repeated, and/or performed in a different order than the order shown. Accordingly, the scope of the invention should not be considered limited to the specific arrangement of steps shown in the flowcharts.

Although multiply dependent claims are not introduced, it would be apparent to one of ordinary skill that the subject matter of the dependent claims of one or more embodiments may be combined with other dependent claims.

In general, one or more embodiments disclosed herein are directed to a device and method for an in-Memory cumulative distribution table (CDT)-based random sampler, featuring custom cell derived from NAND-Type content addressable memory (CAM) for range-matching, pipelined and segmented array for reduced energy, and suppressed timing and power side-channel leakage. The precision and sample range are configurable for different sampling requirements. A 65 nm prototype achieves constant 85.9-MSps, 1-sample/cycle throughput, 20.6-pJ/sample efficiency, and 0.03-mm$^2$ footprint. In particular, CDT method is combined with the nature of range-matching content-addressable memory to eliminate requirements of memory read/write and serial external arithmetic. Thus, embodiments disclosed herein may implement the method to achieve 1 sample/cycle throughput as well as state-of-the-art area requirements. In addition, the method may make use of random masking to flatten the energy consumption to defend against side-channel attacks.

Embodiments of the invention may be used in the general field of using a computation-in-memory sampler suitable for constant high throughput, high energy efficiency, low area, and side-channel robustness against time and power analysis in cybersecurity, machine learning, and scientific computing applications. In particular, one or more embodiments have application in cyber security with post-quantum cryptography and homomorphic encryption as two important possible applications. In addition, one or more embodiments have wide application in machine learning techniques such as Bayesian Neural Network, Gibbs Sampling. In addition, embodiments disclosed herein may have application in solving the problem of random sampling from a given distribution such as Gaussian distribution, binomial distribution and so on. Besides applications mentioned above, one or more embodiments may have application in Particle Filter and Markov-Chain Monte Carlo techniques.

FIG. 1 shows examples of applications of random sampling in security and machine learning in accordance with one or more embodiments. More specifically, random sampling from an arbitrary distribution is widely required by many computation tasks. Progress in quantum computers has drawn increasing attention on post-quantum cryptography (PQC), where many schemes require discrete Gaussian sampling. PQC is described for example in: Banerjee, U., Pathak, A. and Chandrakasan, A. P., 2019, February. 2.3 An energy-efficient configurable lattice cryptography processor for the quantum-secure Internet of Things. In 2019 *IEEE International Solid-State Circuits Conference—(ISSCC)* (pp. 46-48). IEEE; and Song. S., Tang, W., Chen, T. and Zhang, Z., 2018, April. LEIA: A 2.05 mm 2 140 mW lattice encryption instruction accelerator in 40 nm CMOS. In 2018 *IEEE Custom Integrated Circuits Conference (CICC)* (pp. 1-4). IEEE. Homomorphic encryption (HE) is another promising security scheme based on lattice that require Gaussian samples. HE is described for example in Mert, A. C., Öztürk, E. and Savaş, E., 2019. Design and implementation of encryption/decryption architectures for BFV homomorphic encryption scheme. *IEEE Transactions on Very Large Scale Integration (VLSI) Systems,* 28(2), pp. 353-362. Both applications involve Gaussian sampling as noise source to ensure the security of their schemes. Stochastic methods are also widely employed in machine learning, e.g., Gaussian weight sampling in Bayesian neural networks, and arbitrary non-uniform sampling in Gibbs sampling. Bayesian neural networks are described for example in Cai, R., Ren, A., Liu, N., Ding, C., Wang, L., Qian, X., Pedram, M. and Wang, Y., 2018. Vibnn: Hardware acceleration of bayesian neural networks. *ACM SIGPLAN Notices,* 53(2), pp. 476-488. Energy-efficient and high throughput samplers are crucial bottlenecks for these applications. As an example, Gaussian sampling takes more than 50% of cycles in software PQC and HE. In addition, for security applications, it is desired for the sampler to confine time and power side-channel leakage to thwart attackers.

The present application presents an in-Memory cumulative distribution table sampler (hereinafter referred to as "MePLER") that has reduced energy, suppressed timing, and power side-channel leakage resistance over the existing sampling techniques.

FIG. 2 shows a summary of sampling cost in different applications and summary of sampling techniques in accordance with one or more embodiments. More specifically, FIG. 2 illustrates multiple comparative sampling techniques in both software and hardware, and compares the MePLER solution to these existing sampling techniques. Rejection sampling is the most straightforward approach but has low and varying throughput. Bernoulli sampling improves throughput but is restricted to a few distributions. Bernoulli sampling is described for example in Zhao, R. K., Steinfeld, R. and Sakzad, A., 2019. FACCT: fast, compact, and constant-time discrete Gaussian sampler over integers. *IEEE Transactions on Computers,* 69(1), pp. 126-137. Cumulative Distribution Table (CDT) sampling using cumulative distribution lookup table and Knuth-Yao (KY) sampling using binary decision tree are widely adopted in hardware, because of their simple logic and table-based structures. Cumulative distribution table sampling is described for example in Howe, J., Khalid, A., Rafferty, C., Regazzoni, F. and O'Neill, M., 2016. On practical discrete Gaussian samplers for lattice-based cryptography. *IEEE Transactions on Computers*, 67(3), pp. 322-334. KY sampling is described for example in: Karmakar, A., Roy, S. S., Reparaz, O., Vercauteren, F. and Verbauwhede, I., 2018. Constant-time discrete gaussian sampling. *IEEE Transactions on Computers*, 67(11), pp. 1561-1571; Kong, L. and Liu, R., 2020. High-Performance Constant-Time Discrete Gaussian Sampling. *IEEE Transactions on Computers*; and Mera, J. M. B., Turan, F., Karmakar, A., Roy, S. S. and Verbauwhede, 1., 2020, July. Compact domain specific co-processor for accelerating module lattice-based KEM. In 2020 *57th ACM/IEEE Design Automation Conference (DAC)* (pp. 1-6). IEEE. However, conventional KY samplers suffer from non-constant and low throughput, while recent optimizations realize (near-)constant and high throughput at the cost of large footprint and hardwired logic, making them not suitable for ASIC. Although there are KY samplers that have been proposed that address non-constant issues, they still require large area and need to be hard coded for each specific fixed distribution. Wallace method has a high throughput at the cost of high communication complexity.

Traditional CDT samplers perform linear or binary search to find the sample corresponding to the randomly generated probability. The search delay renders CDT samplers relatively slow and side-channel leaky. Forcing all searches to go through the full table avoids timing information, but at the penalty of further reduced speed and energy efficiency. CDT samplers are discussed for example in Banerjee, U., Pathak, A. and Chandrakasan, A. P., 2019, February. 2.3 An energy-efficient configurable lattice cryptography processor for the quantum-secure Internet of Things. In 2019 *IEEE International Solid-State Circuits Conference—(ISSCC)* (pp. 46-48). IEEE.

To this end, embodiments disclosed herein provide an in-Memory Random CDT Sampler based on a pipelined range-matching CAM, with 20.6-pJ energy, constant 85.9-MSps throughput, 0.03-mm² footprint, and suppressed timing/power side-channel leakage. In-Memory Random CDT Sampler can be easily programmed for arbitrary distribution with configurable precision and range.

In-Memory Random CDT Sampler Design and Implementation

Figure 3:
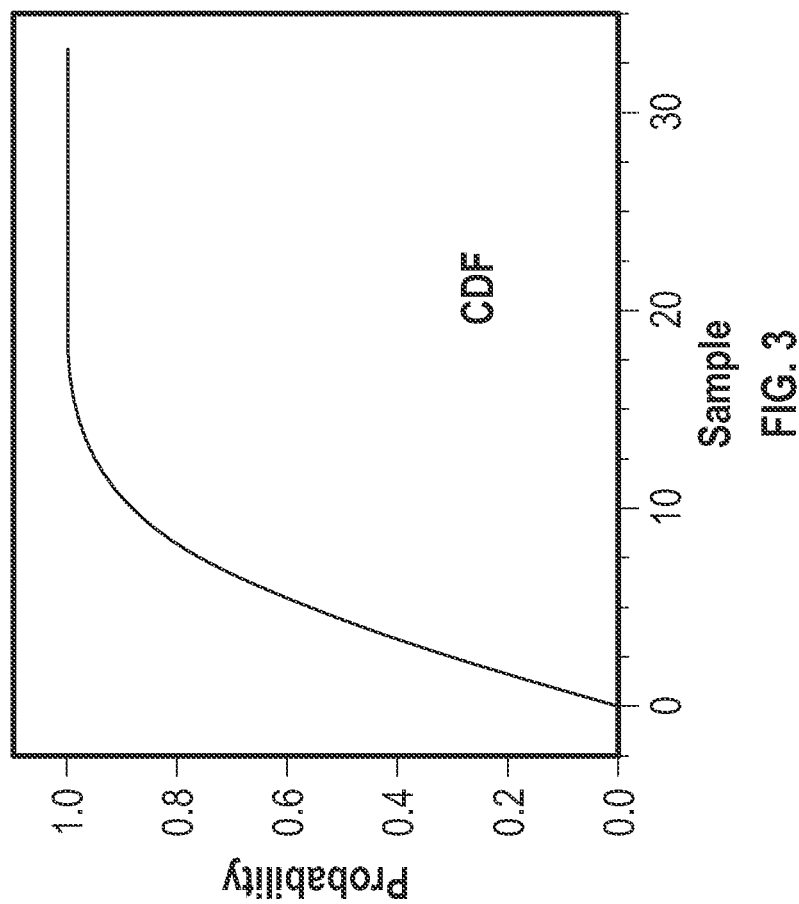
FIG. 3 shows a principle of CDT algorithm.

FIG. 3 shows a principle of CDT sampling algorithm according to one or more embodiments. Instead of sampling directly sampling from variables probability density function (PDF), CDT uses a cumulative distribution function (CDF) and constructs the table evaluated at some positive integer points including zero. Given a random number U sampled from uniform distribution, the idea of the CDT sampler is to generate an integer X, which satisfies the condition of $F(X-1)<U \leq F(X)$. F( ) refers to the precomputed CDT table as shown in FIG. 3.

In other words, CDT sampling is an instantiation of inversion sampling that requires a precomputed cumulative CDF table. Then it finds the interval in the table that a uniform random sample from [0,1] falls into. The index of the interval will be a random sample following the given CDF.

Figure 4:
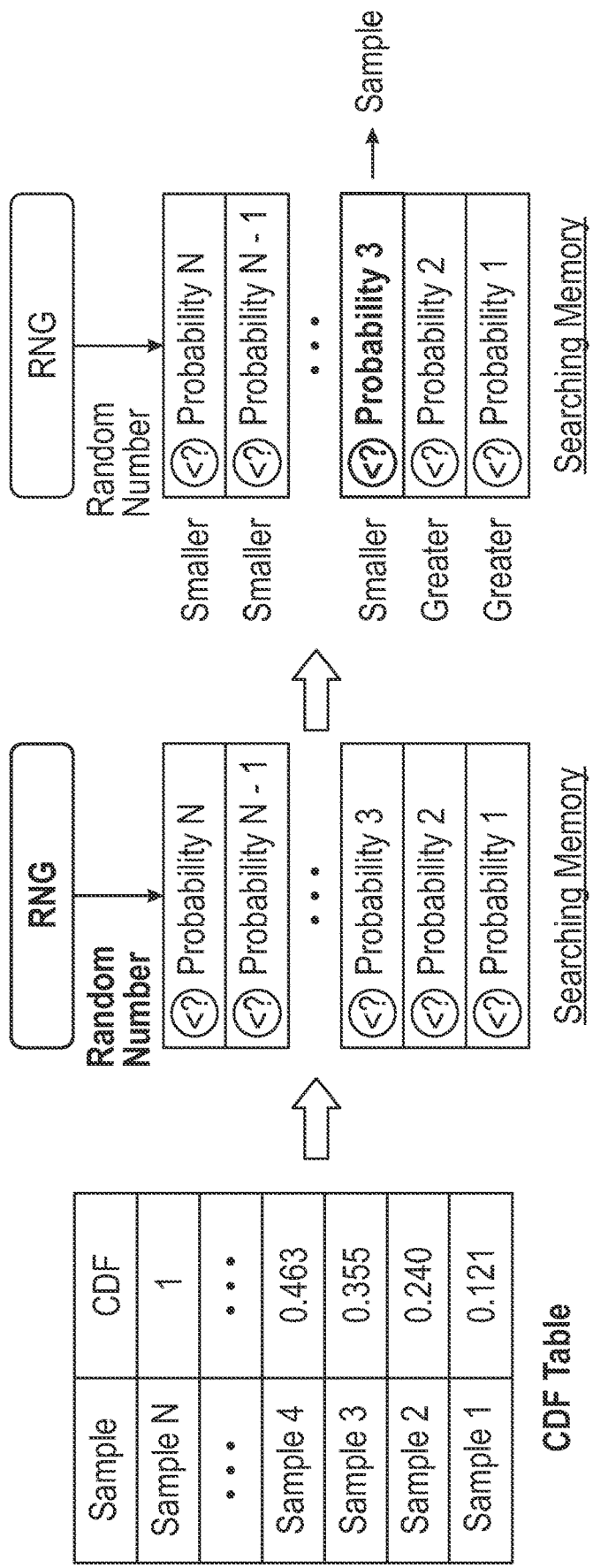
FIG. 4 shows a sampling method in accordance with one or more embodiments.

In accordance with one or more embodiments, FIG. 4 shows the MePLER where the comparison is performed in parallel. As shown in the drawing, the CDT has N rows with a cumulative probability value in each row. For example, the cumulative probability is 0.121 for sample 1. The CDT may be stored in the CAM in an ascending order or descending order. The cumulative probability values in CDT may be converted to decimal values. For example, the cumulative probability 0.121 for sample 1 may be converted to 121 in decimal. The decimal value may further be converted into binary value. In this case, 121 in decimal would be 1111001 in binary. In other words, the 0.121 in sample 1 may be stored as 1111001 by the CAM cells.

Next, in accordance with one or more embodiments, a random number generator may generate a random binary number that is input into the search line. The CAM cells may then compare the input number with the stored data.

Figure 5:
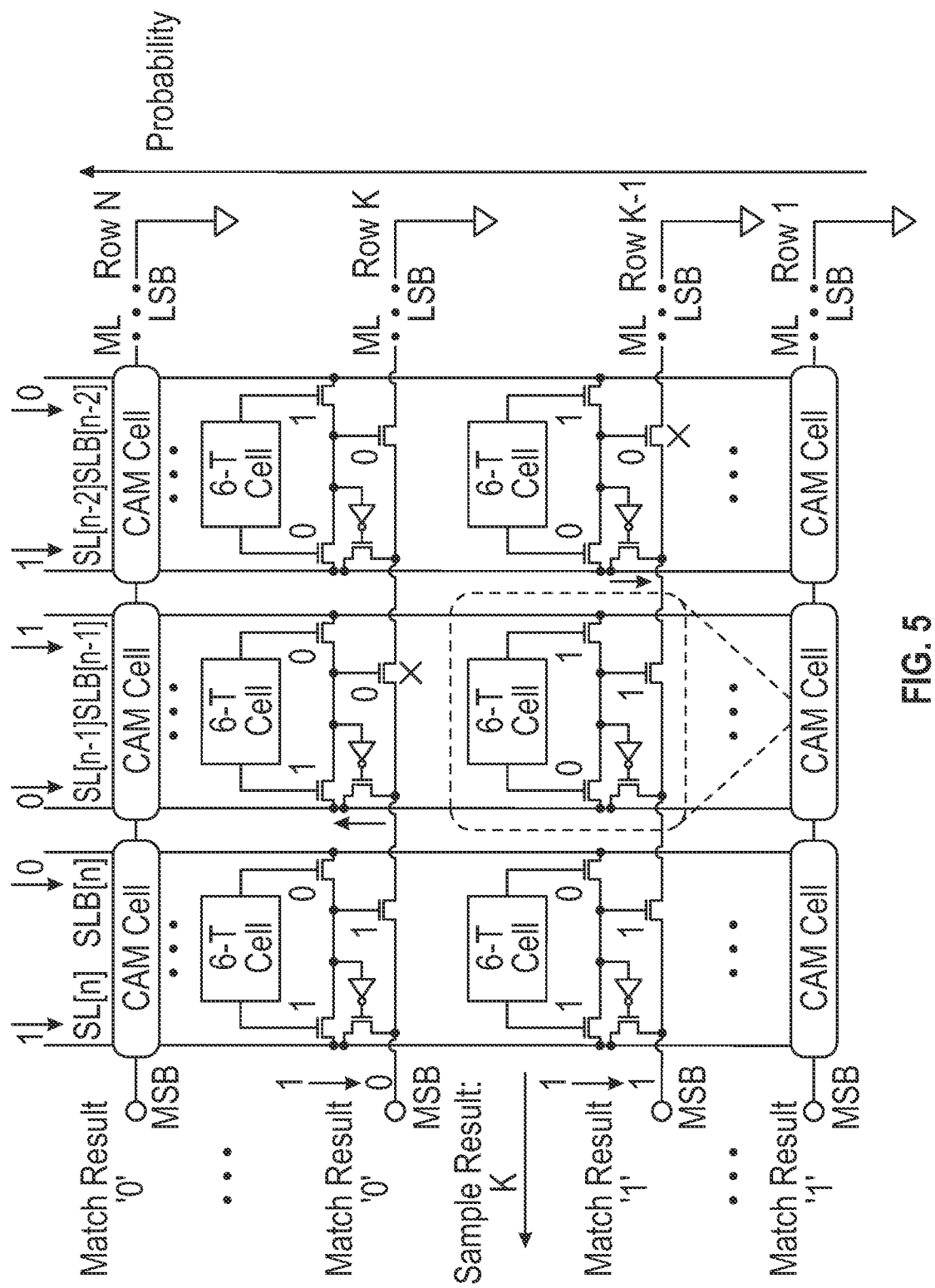
FIG. 5 shows a principle of random sampling in accordance with one or more embodiments.

In accordance with one or more embodiments, FIG. 5 illustrates a structure of the in-memory CDT sampler. According to the embodiments of FIG. 5, the memory stores the CDT and compares the input number with every stored value. As a result of the comparison, the in-Memory Random CDT Sampler not only finds an exact match, it also finds an interval that the input belongs to.

In one or more embodiments, as shown in FIG. 5, the input values are 1, 0, and 1. If the stored values are also 1, 0, and 1, then the input values would match the stored values. Under this circumstance, the match line (ML) is shorted from significant bit (MSB) to least significant bit (LSB) with all pass gates turned on.

In the embodiments according to FIG. 5, the input values may be 1, 0, and 1 and the stored values of Row K may be 1, 1, and 0. In other words, there may be a mismatch between the input values and stored values. Under this circumstance, the input values are smaller than the stored values. The value of ML among a plurality of MLs will be decided by the highest mismatched bit. Within this bit, the pass gate will disconnect the ML and drive ML to the input search line (SL). As a result, the CAM serially performs matching from MSB to LSB. The range matching result will appear at MSB end of ML, which will be "0" for Row K.

In the embodiments according to FIG. 5, the input values may be 1, 0, and 1 but the stored values of Row K−1 may be 1, 0, and 0. In other words, there may be a mismatch between the input values and stored values. Under this circumstance, the input values are greater than the stored values. The value of ML will be decided by the highest mismatched bit. Within this bit, the pass gate will disconnect the ML and drive ML to the input SL. As a result, the CAM serially performs matching from MSB to LSB. The range matching result will appear at MSB end of ML, which will be "1" for Row K−1.

In the embodiments according to FIG. 5, a plurality of 6-Transistor (6-T) cells may be used to perform the above-mentioned range matching. 6-T cells are static random-access memory (SRAM) that can retain the stored information as long as power is supplied. The structure of a 6-T cell typically comprises two CMOS inverters and two access MOSFETs.

In one or more embodiments, the above-mentioned range matching may be performed with specially designed NAND-type CAMs, requiring one extra NMOS controlled by an inverter over the standard 9-T Binary CAM cell (which includes three extra NMOS in addition to the above-mentioned 6-T SRAM cell). Traditional NAND-type CAM cells have a pass gate controlled by the XOR logic of search line (SL) and stored data. The pass gate may be an analog gate that comprises a plurality of MOSFETs.

In one or more embodiments, the in-Memory Random CDT Sampler may comprise a plurality of pass gates that connect from MSB to LSB. The search data is fed in through the SL and compared with the stored data. Only when search data fully matches stored data will the ML be connected from head to tail. Some embodiments may make use of this serial connection for range matching. The CDF table is stored in the CAM in an ascending order. If the input data matches a row in the table, the ML is shorted from MSB to LSB with all pass gates turned on. When there is a mismatch, the value of ML will be decided by the highest mismatched bit. Within this bit, the pass gate will disconnect the ML and drive ML to the input SL. As a result, the CAM serially performs matching from MSB to LSB. The range matching result will appear at MSB end of ML, which will be "0" if input is smaller or equal to the stored value, and "1" if input is larger than the stored one.

In the above embodiments, the in-Memory Random CDT Sampler has the advantages of compact in-memory sampling, parallel comparison, low power consumption, and constant latency that avoids time domain side channel leakage.

To further reduce redundant comparison, long delay of NAND-type ML, and avoid power domain side channel attacks, the single-end in-Memory Random CDT Sampler may be replaced with a segmented array, as explained below.

Figure 6:
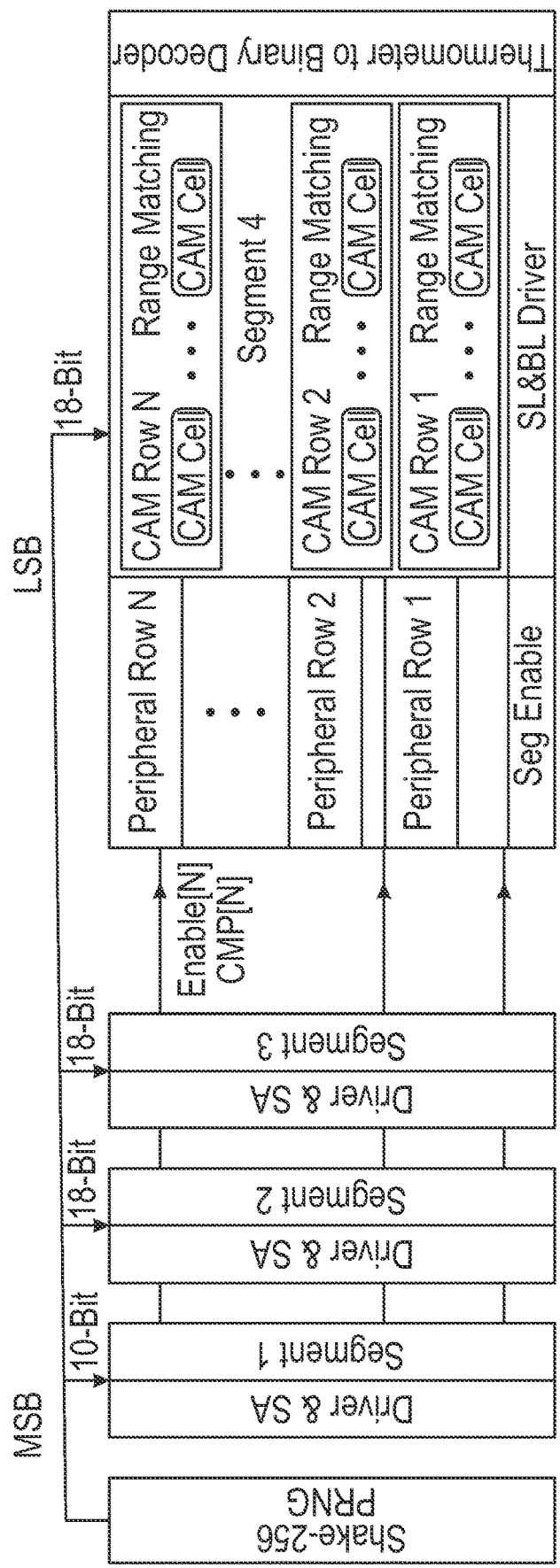
FIG. 6 shows block diagram of the differential segmented in-Memory Random CDT Sampler, schematic of cells and peripherals in accordance with one or more embodiments.
Figure 6:
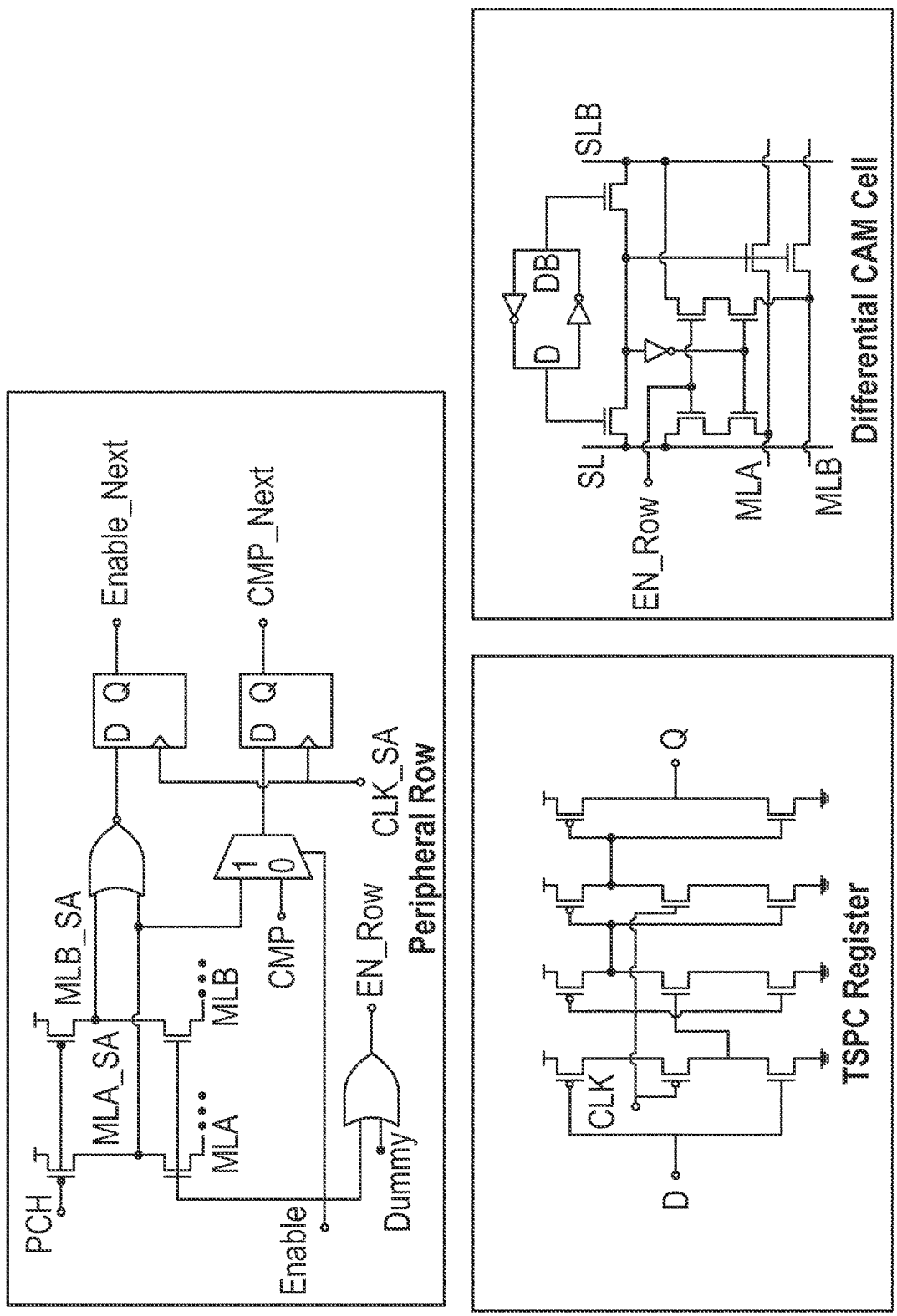

In one or more embodiments, FIG. 6 shows a block diagram of the differential segmented in-Memory Random CDT Sampler. Now the array is replaced with four pipelined segments. If all the comparison results have been obtained for each segment, rows in subsequent cells may be disabled to avoid redundant search. If no rows need to be further searched, then all the remaining segments may be disabled to avoid redundant search and increases throughput through pipelining.

In one or more embodiments, the segmented design also requires differential MLs to generate the enabling signal for next segment, because it is only needed when the previous segment has exact match, which means the MSBs of input and stored data are matched. This state can only be represented by having both MLs at "0." Moreover, differential MLs reduce the energy difference when input varies, thus suppressing power side-channel leakage compared with single-end designs. Only enabled rows will perform comparisons in a segment, while other disabled rows will pass matching results from last segment through multiplexers and pipelined registers. With fewer transistors and faster transitions in the signal path, true single-phase clock (TSPC) register design result in less transistors and faster speed.

In other words, due to the random nature of input, the range-matching will terminate in first few bits in most cases for most of the rows. Matching remaining LSBs waste energy on both ML and SL. The serial pass gates also induce large delay. Thus, in some embodiments the array is divided into pipelined segments. Each segment contains cells, column peripherals and row peripherals. Segmented array avoids redundant search when search on all rows terminates early.

In one or more embodiments, a differential CAM cell may be applied as shown in FIG. 6. Two MLs (MLA and MLB) are included. Each ML includes a pass gate controlled by the XOR logic between SL and stored data, and two serially connected NMOS controlled by a shared inverter and a shared row enable control. The row enable signal is introduced to support row wise power gating, which prevents activities on the ML when a segment is disabled.

In one or more embodiments, the segment row peripheral may include a NOR-logic of the differential MLs sampled by a register, whose output is used as the enable signal for the same row in next segment. Only when both MLs are low, the output can be '1', which means the input data matches exactly to the row data in all processed segments. A TSPC register may be used because of less transistors and higher speed.

In one or more embodiments, a matching result propagation circuit may be applied within the segment row peripheral. If the current row is enabled, then the MLA_SA signal is used as evaluation result, and sent to next segment. Otherwise, evaluation result from last segment will be forwarded to the output.

In one or more embodiments, the segment row peripheral may include a precharge circuit to precharge MLA and MLB to supply voltage before matching.

In one or more embodiments according to FIG. 6, uniform random inputs for sampling may be generated by a SHAKE-256 PRNG. The thermometer coded CAM results may be lastly converted to binary output.

Figure 7:
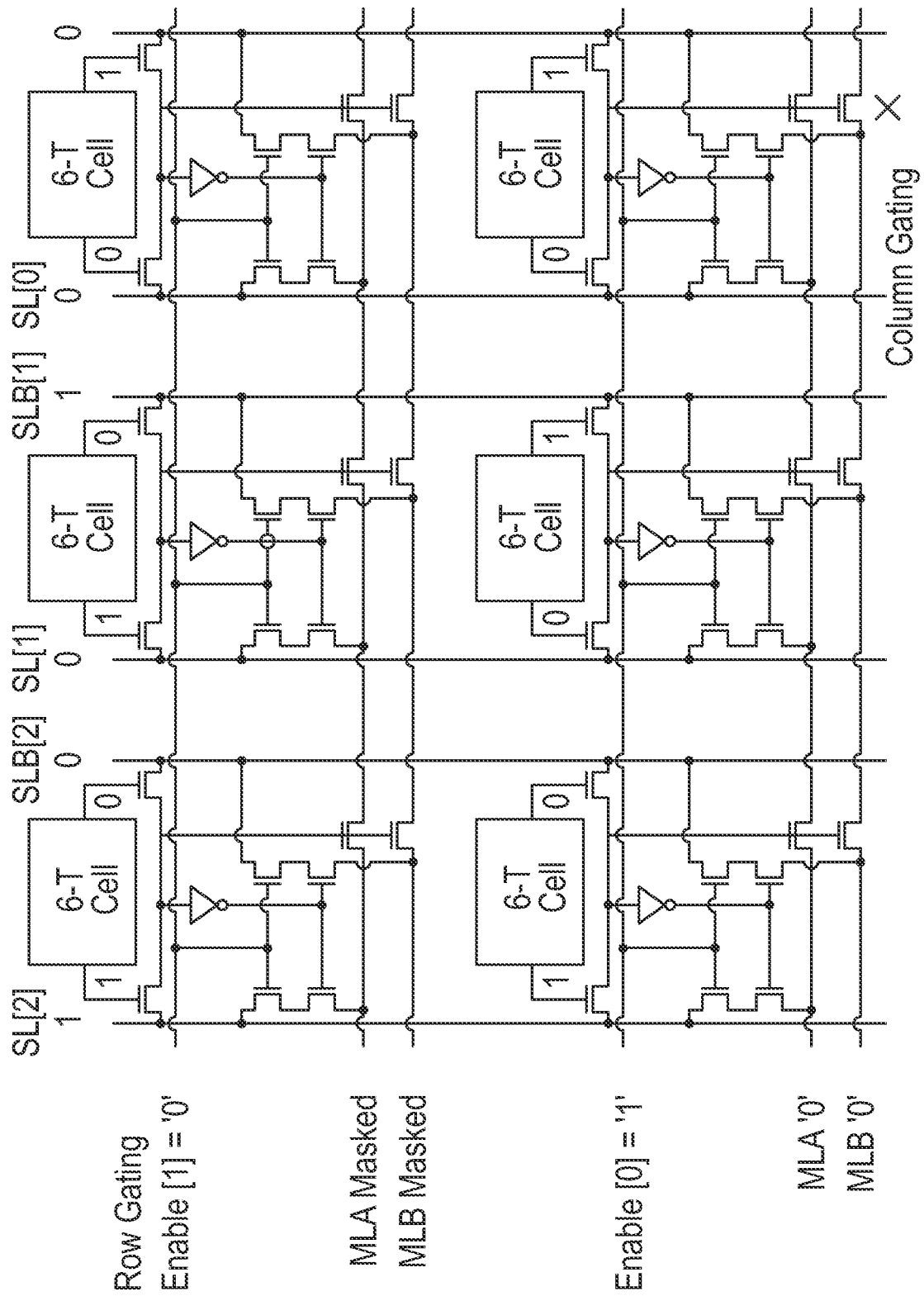
FIG. 7 shows column-wise gating for configurable precision and row-wise gating for configurable range in accordance with one or more embodiments.

FIG. 7 shows column-wise gating for configurable precision and row-wise gating for configurable range in accordance with one or more embodiments. In one or more embodiments, to further save energy, both row-wise and column-wise power gating is supported, as shown in FIG. 7. A pair of row enable switch may be inserted to each cell to enable/disable the search. The enable signal is controlled by previous segment. By disabling initial enable signal of unused rows in first segment, row-wise power gating is achieved to reduce the search. For distributions with less than 64-bit precision, column-wise power gating is designed to ground the MLs and disable all following SLs.

In one or more embodiments, the column power gating may be disabled to reduce redundant SLs to configure precision. The row power gating may also be disabled to limit a sampling range to save energy on MLs.

In one or more embodiments, prototype includes a 64×64 array, supporting a sampling range of −63 to 63 and a precision of 64-bit. This precision is sufficient for 128-bit post-quantum security. For wider Gaussian distributions with larger sigma, multiple steps of Gaussian convolution may be applied to the data to effectively enlarge the sampling range.

Figure 8:
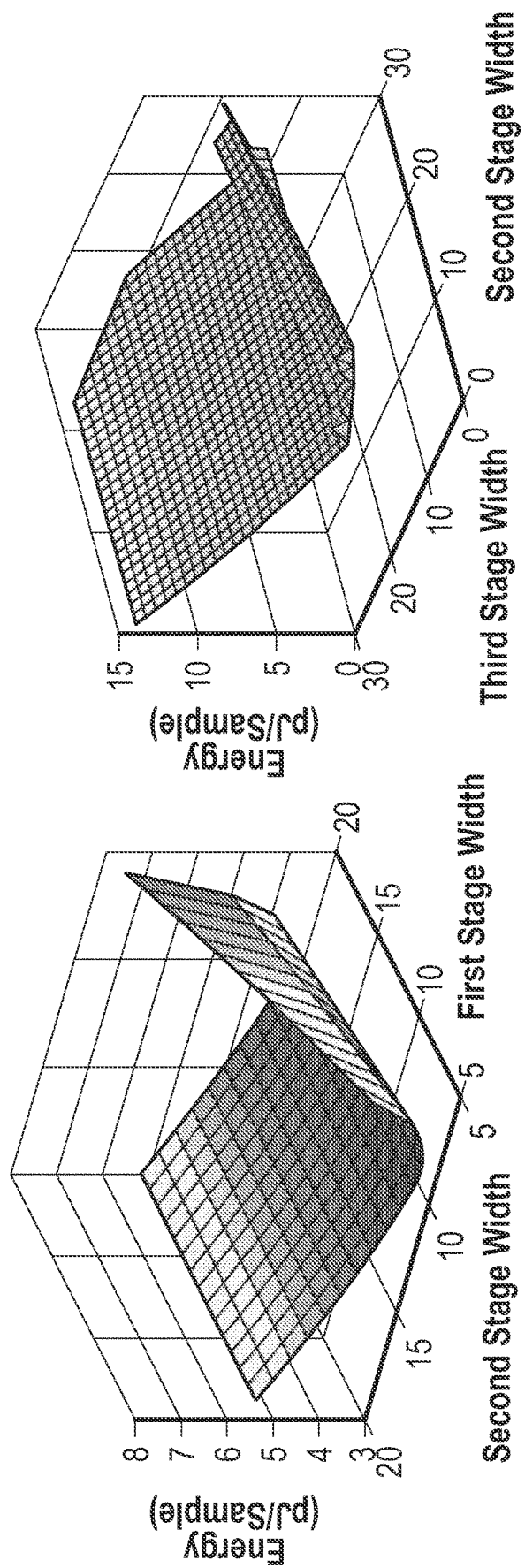
FIG. 8 shows parameter sweep for segment width selection in accordance with one or more embodiments.

FIG. 8 shows parameter sweep for segment width selection using post-layout results in accordance with one or more embodiments. Four-stage pipelines with 10, 18, 18 and 18 bits per segment are chosen, through optimization of energy, area and delay for Gaussian CDT and random matching patterns as shown in the simulation results of FIG. 8.

Side-Channel Analysis (SCA) and Defense

Figure 9:
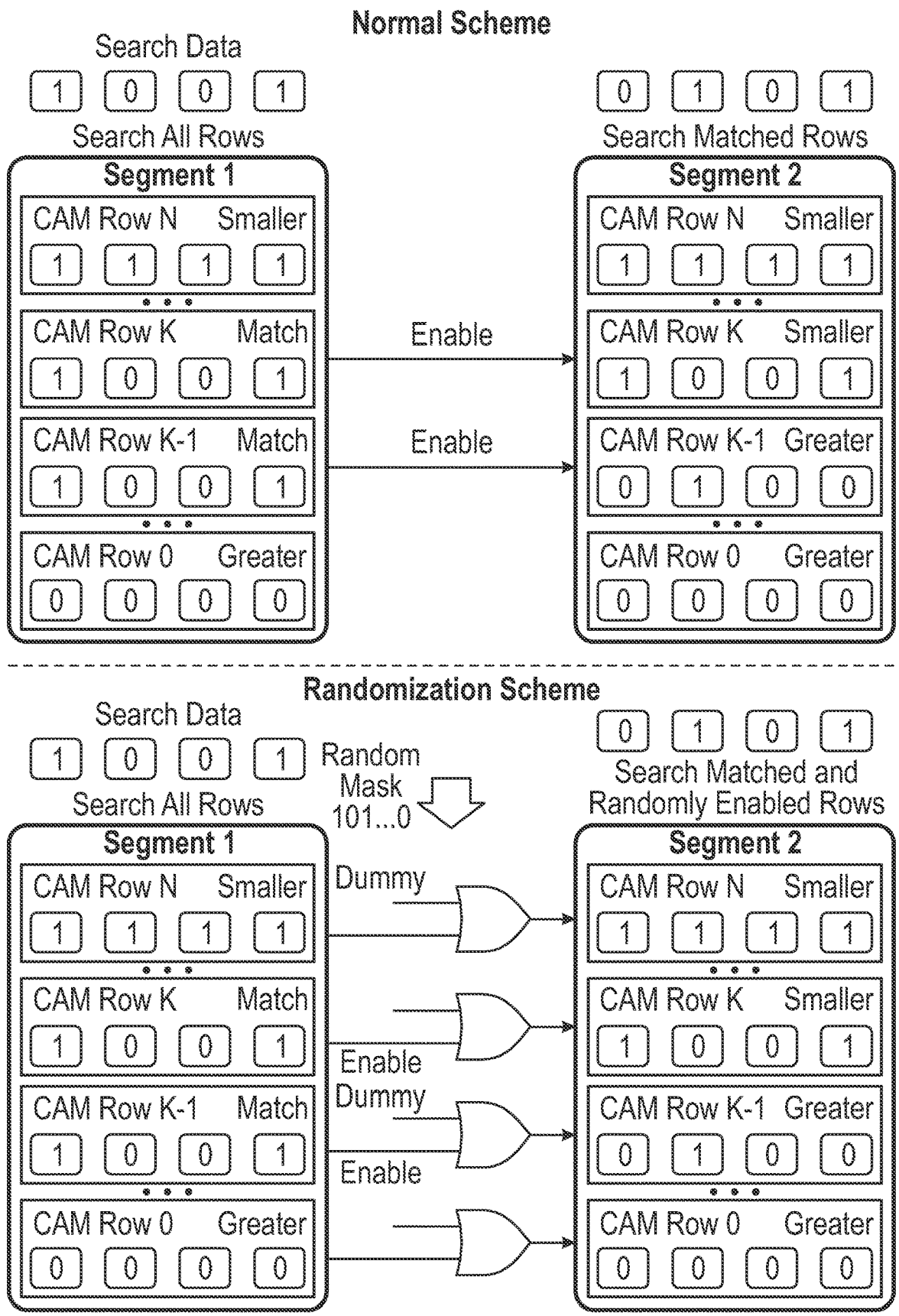
FIG. 9 shows random masking scheme in accordance with one or more embodiments.

Timing and power signals are major sources of SCA. Embodiments of design disclosed herein naturally has a constant 1 sample per cycle speed, thus is robust to timing attacks. In order to increase the resistance in power SCA, a random masking scheme is designed. FIG. 9 shows a random masking scheme in accordance with one or more embodiments. The random masking scheme is applied with a dummy and enable input controlled by an OR logic gate. Beside the rows to be automatically enabled for searching, a temporal random mask (dummy signals in FIG. 9) with a programmable maximum number of ones is generated by the PRNG to activate unused rows and obfuscate the power signatures.

Figure 10:
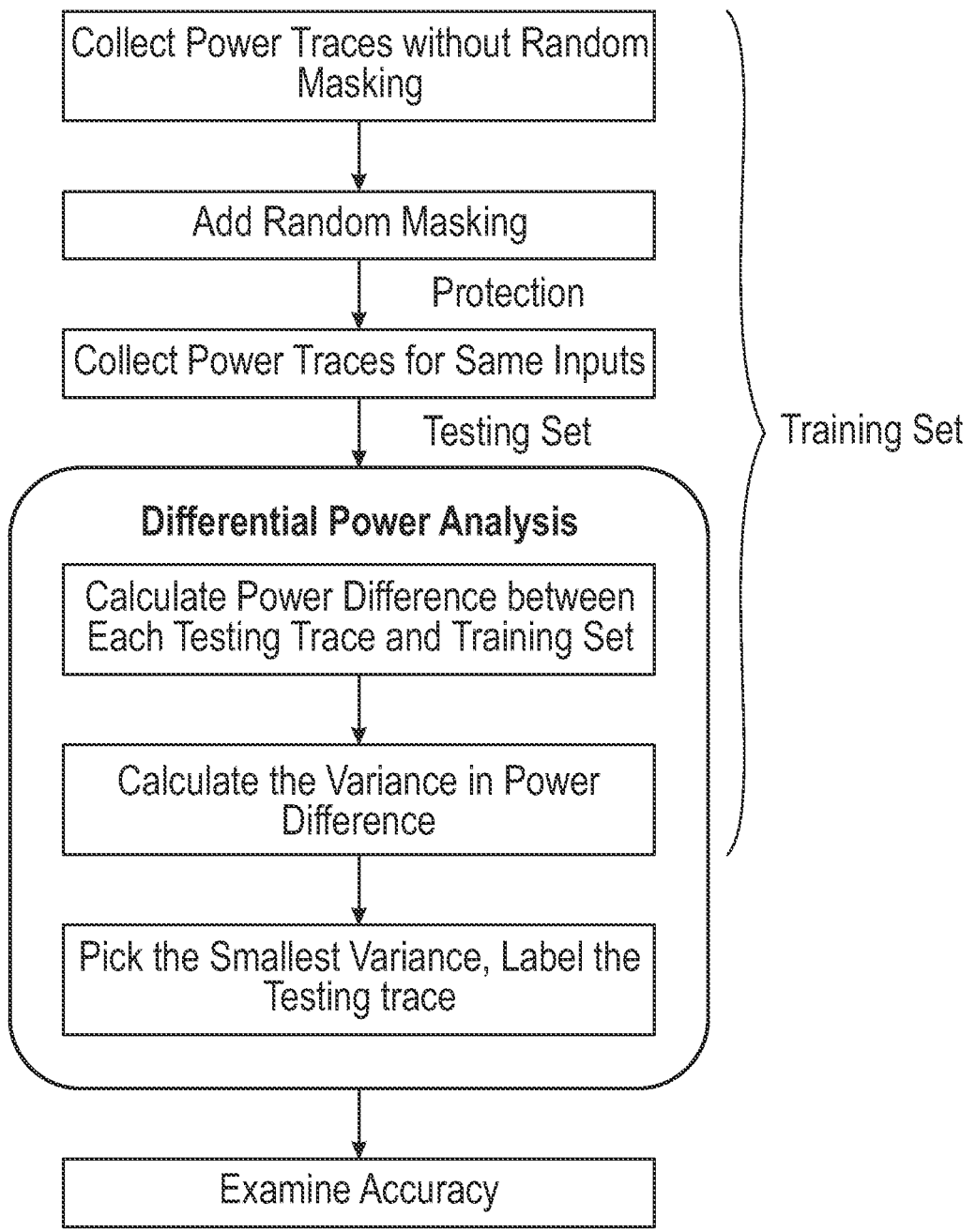
FIG. 10 shows a flowchart that explains a differential power analysis (DPA) flow in accordance with one or more embodiments.
Figure 11B:
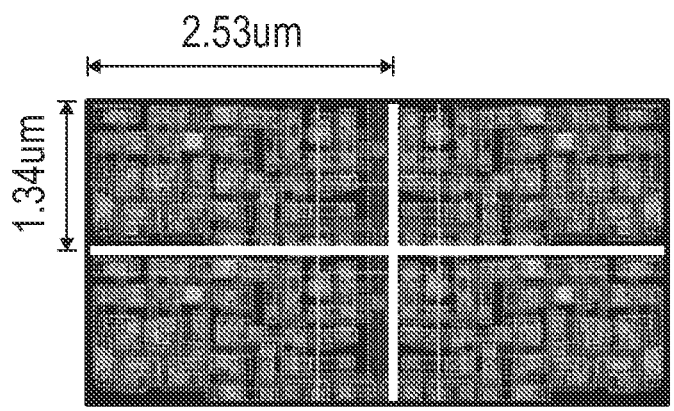
FIGS. 11A and 11B show an example of chip micrograph (left) and 2×2 cell layout (right) in accordance with one or more embodiments.
Figure 11A:
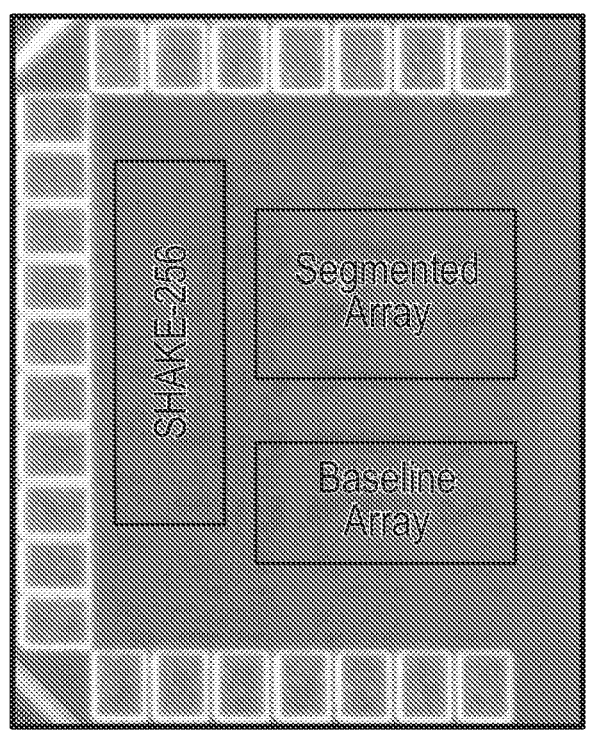

In one or more embodiments, a differential power analysis (DPA) scheme is utilized as shown in flowchart in FIG. 10 to examine an accuracy of SCA. Specifically, a first set of power traces may be collected without random masking. Random masking traces may be applied to the segments for protection in power SCA. Then a second set of power traces for the same inputs may be collected. As a result, the difference between the first set of power traces and the second set of power traces may be obtained. A variance and power difference may be further calculated. A smallest variance may be selected, and the testing trace may be labeled. Finally, the accuracy of such test may be examined. Measurements In one or more embodiments, the differential 16-T CAM cell is fabricated in Taiwan Semiconductor Manufacturing Company (TSMC) 65 nm low power (LP) process and takes 802F2 in logic rule, as shown in FIGS. 11A and 11B.

Figure 12:
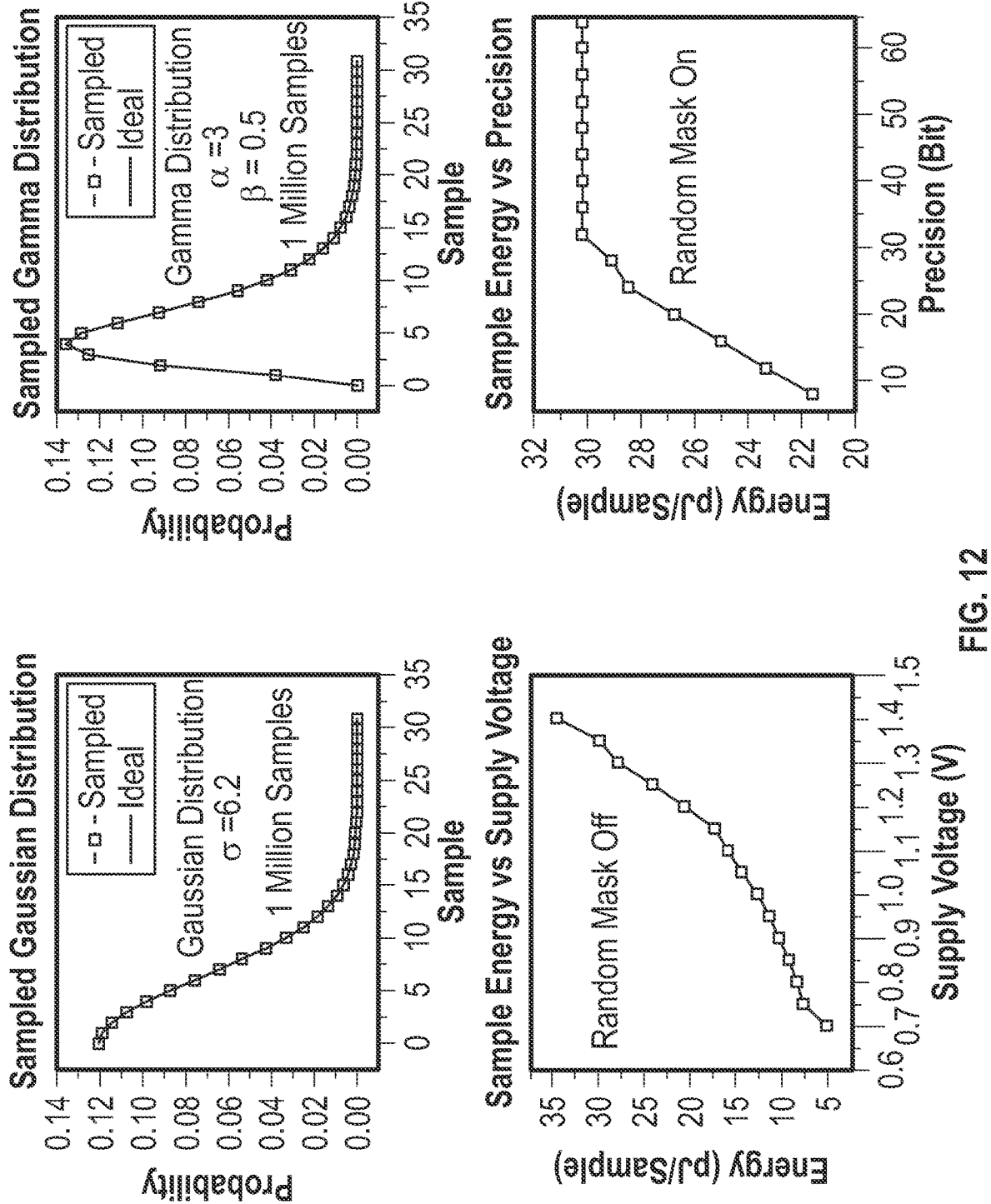
FIG. 12 shows an example of measured data in accordance with one or more embodiments.

In one or more embodiments, FIG. 12 provides measurements results of the in-Memory Random CDT Sampler samples. The top two plots provide examples comparing the sampled Gaussian and Gamma distribution with the ideal waveform after 1 million samples. As shown in the plots, the sampling results strictly follow the ideal waveforms.

In one or more embodiments, FIG. 12 provides measurements results of the energy consumption. The bottom two plots provide examples comparing the energy consumption of in-Memory Random CDT Sampler with a random mask and without a random mask.

In one or more embodiments, without random masking, the energy consumption ranges from 5 to 35 pJ per sample across 0.7 to 1.4 V for Gaussian sampling. The energy consumption scales with precision but saturates at around 30 bits because most searches would conclude in a first few bits.

Figure 13:
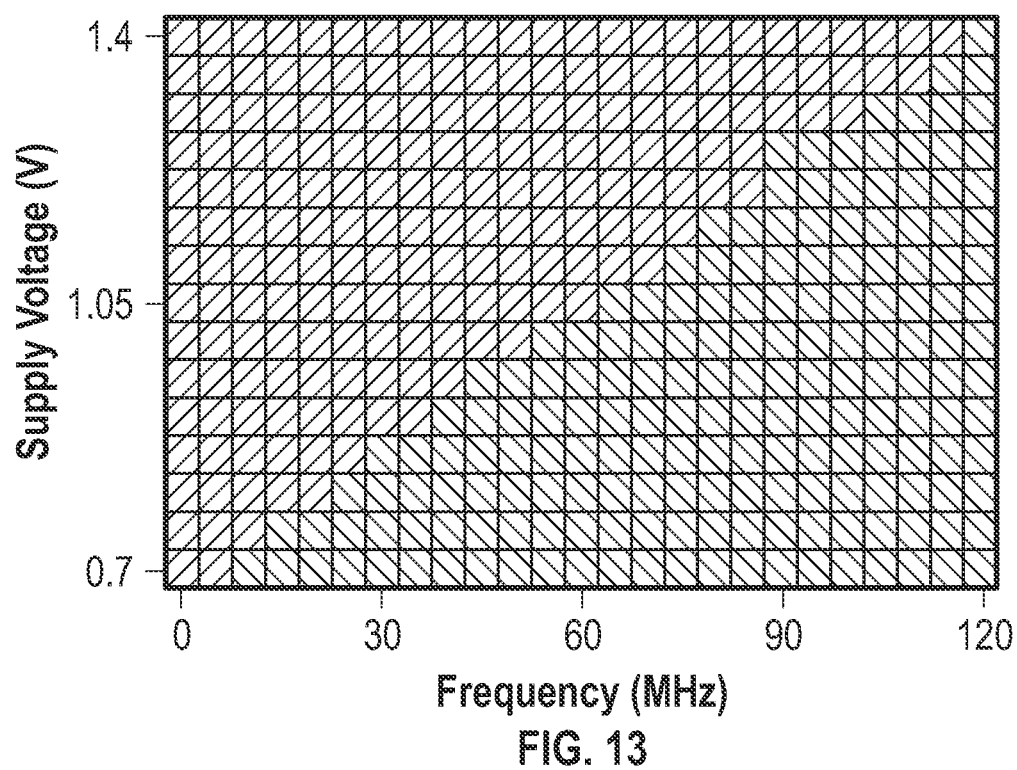
FIG. 13 shows system plot in accordance with one or more embodiments.

In one or more embodiments, FIG. 13 is a Shmoo plot that displays a response of in-Memory Random CDT Sampler varying over supply voltage and operation frequency.

Figure 14:
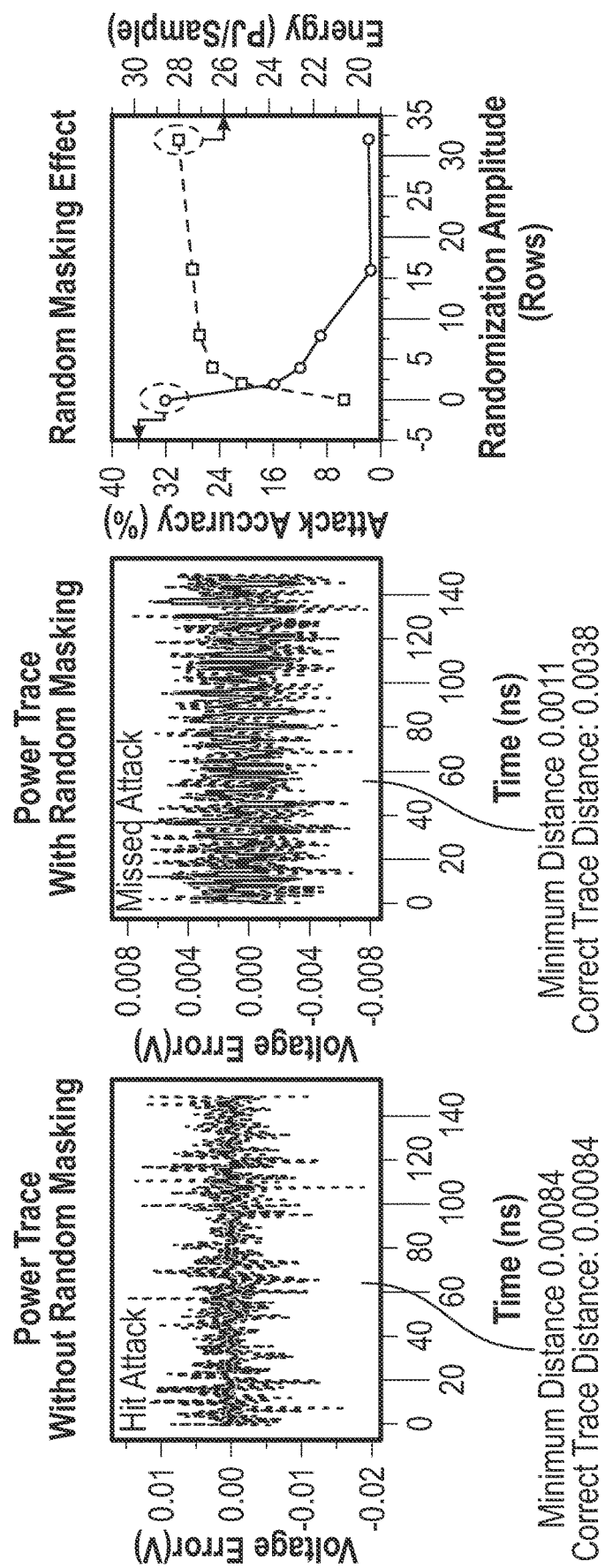
FIG. 14 shows DPA and random masking effect in accordance with one or more embodiments.

In one or more embodiments, FIG. 14 compares the side channel attack with and without masking using the DPA approach applied in FIG. 10. By applying the DPA approach, when no mask is applied, the side channel attack may find the correct trace distance. In contrast, when a mask is applied, the tracing would be obfuscated and the side channel attack can no longer find the correct trace distance through the DPA approach.

In other words, the attack accuracy drops significantly as a randomization amplitude of rows increases. Necessarily, the energy consumption also increases as a cost of the random masking, but the increase less than 10 pJ/sample energy overhead. In one or more embodiments, column-wise power-gating may also save up to 30% energy at low precisions.

FIG. 15 is a comparison table of method and technology disclosed herein with respect to references with different methods and technologies in accordance with one or more embodiments.

Figure 16:
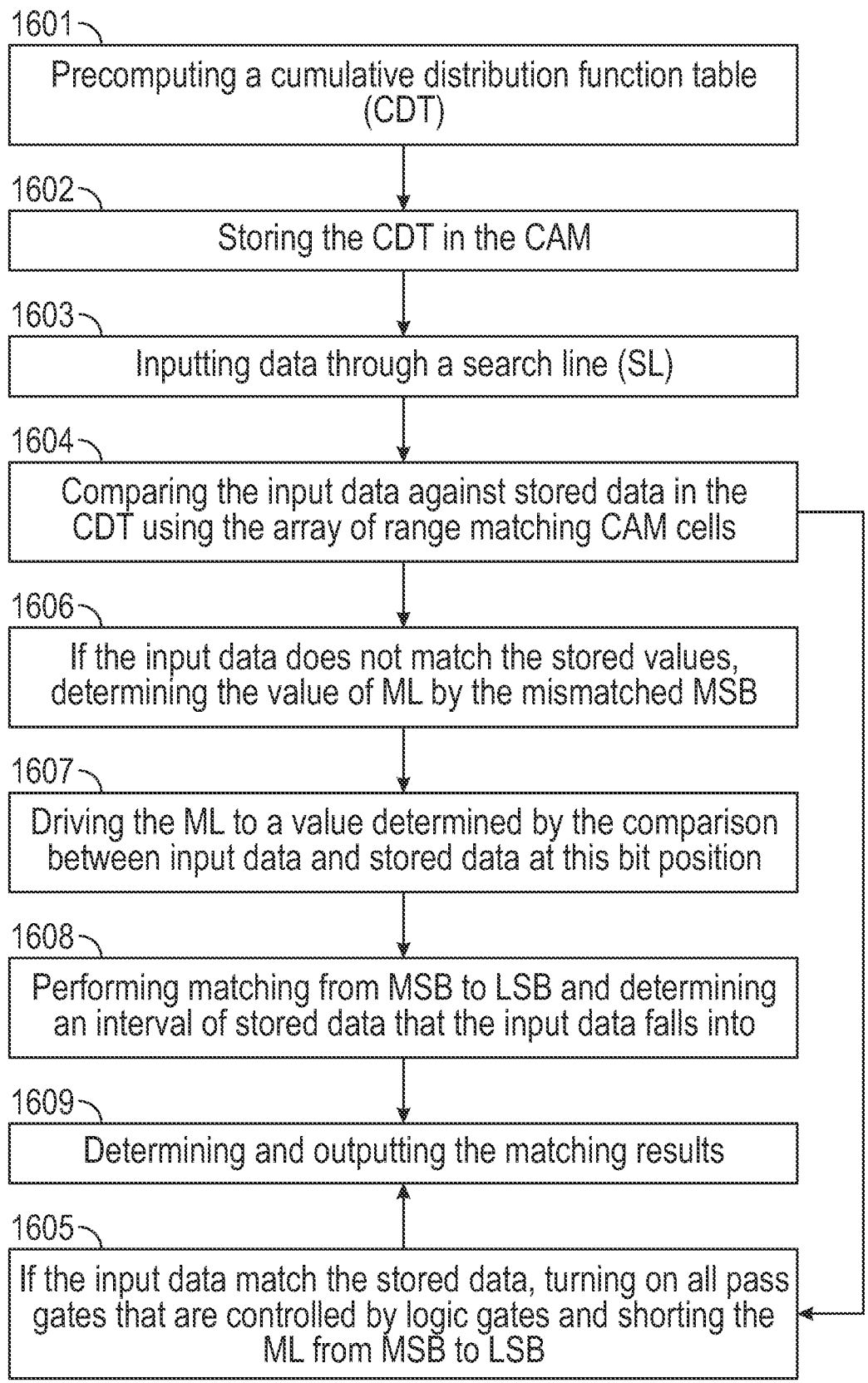
FIG. 16 shows a flowchart in accordance with one or more embodiments.

Turning to FIG. 16, FIG. 16 shows a flowchart describing methods for range matching a random sample for a distribution, in accordance with one or more embodiments. While the various steps in FIG. 16 are presented and described sequentially, one of ordinary skill in the art will appreciate that some or all of the steps may be executed in different orders, may be combined or omitted, and some or all of the steps may be executed in parallel. Furthermore, the steps may be performed actively or passively. The method may be repeated or expanded to support multiple components and/or multiple users within a field environment. Accordingly, the scope of the invention should not be considered limited to the specific arrangement of steps shown in the flowchart.

In Step 1601, a CDT may be precomputed based on a given distribution.

In Step 1602, the CDT may be stored in the CAM in ascending or descending order.

In Step 1603, data is input to the device through a SL.

In Step 1604, the CAM compares the input data against the stored values in the CDT using an array of range matching cells.

In Step 1605, if the input data matches a row in the table, the ML may be shorted from MSB to LSB with all pass gates turned on.

In Step 1606, if there is a mismatch, the value of ML among a plurality of MLs may be decided by the first mismatched MSB.

In Step 1607, within this mismatched MSB, the ML may be driven to a value determined by the comparison between the input data and stored data.

In Step 1608, the CAM serially performs matching from MSB to LSB to determine an interval of stored data that the input data falls into.

In Step 1609, the matching results may be determined and output based on the matchings performed above.

Figure 17:
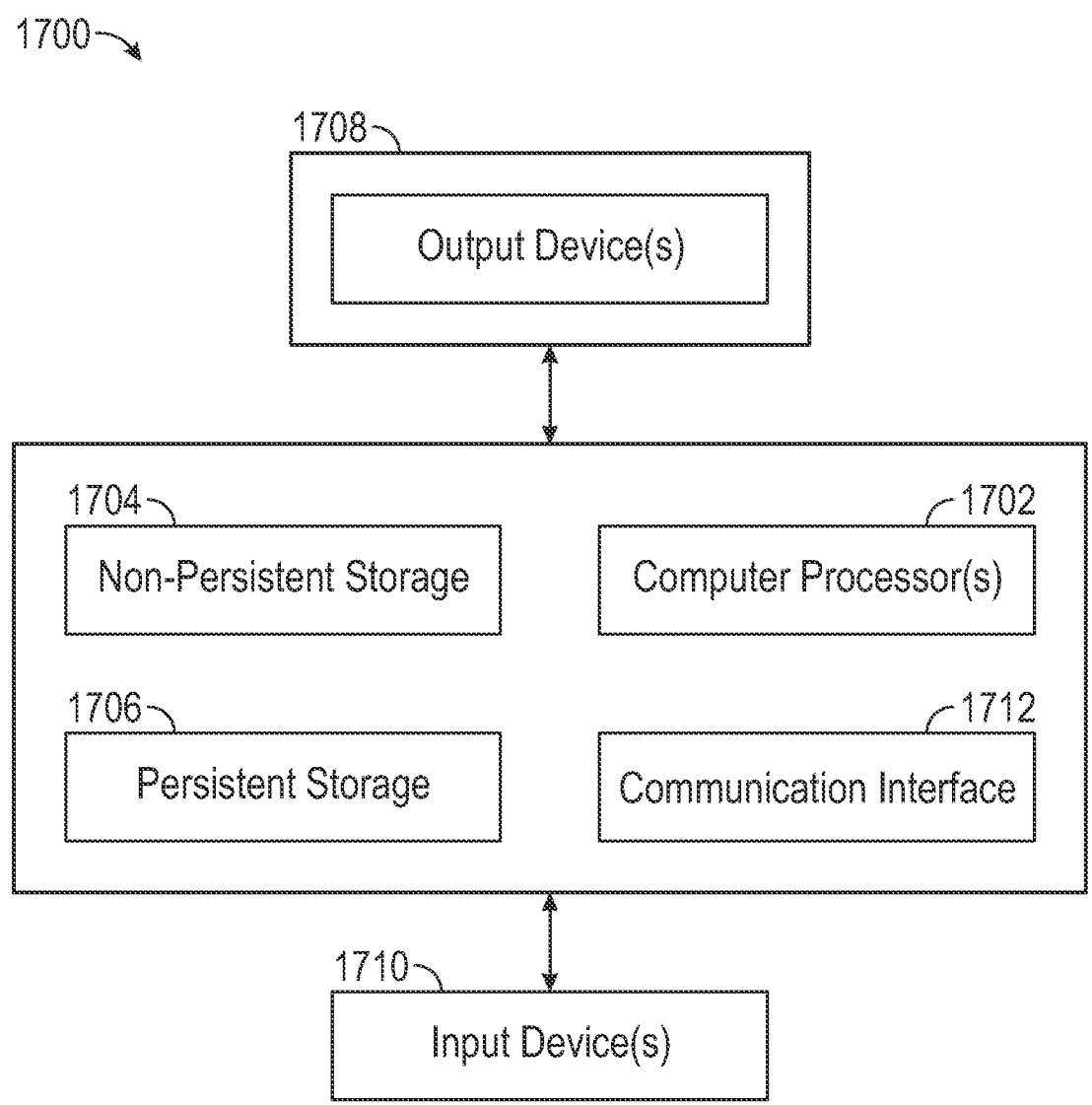
FIG. 17 shows a computing system in accordance with one or more embodiments.

The subject matter described in one or more embodiments above may be implemented in a computing system. FIG. 17 shows a computing system in accordance with one or more embodiments of the invention. Any combination of mobile, desktop, server, router, switch, embedded device, or other types of hardware may be used. For example, as shown in FIG. 17, the computing system (1700) may include one or more computer processors (1702), non-persistent storage (1704) (for example, volatile memory, such as random access memory (RAM), cache memory), persistent storage (1706) (for example, a hard disk, an optical drive such as a compact disk (CD) drive or digital versatile disk (DVD) drive, a flash memory), a communication interface (1712) (for example, Bluetooth interface, infrared interface, network interface, optical interface), and numerous other elements and functionalities.

The computer processor(s) (1702) may be an integrated circuit for processing instructions. For example, the computer processor(s) may be one or more cores or micro-cores of a processor. The computing system (1700) may also include one or more input devices (1710), such as a touchscreen, keyboard, mouse, microphone, touchpad, or electronic pen.

The communication interface (1712) may include an integrated circuit for connecting the computing system (1700) to a network (not shown) (for example, a local area network (LAN), a wide area network (WAN), such as the Internet, mobile network, or any other type of network) or to another device, such as another computing device.

Further, the computing system (1700) may include one or more output devices (1708), such as a screen (for example, a liquid crystal display (LCD), a plasma display, touchscreen, cathode ray tube (CRT) monitor, or projector), a printer, external storage, or any other output device. One or more of the output devices may be the same or different from the input device(s). The input and output device(s) may be locally or remotely connected to the computer processor(s) (1702), non-persistent storage (1704), and persistent storage (1706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s) is configured to perform one or more embodiments of the disclosure.

The computing system (1700) in FIG. 17 may be connected to or be a part of a network. For example, the network may include multiple that correspond to a computing system, such as the computing system shown in FIG. 17, or a group of nodes combined may correspond to the computing system shown in FIG. 17. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (1700) may be located at a remote location and connected to the other elements over a network.

The computing system or group of computing systems described in FIG. 17 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the selection by the user.

The computing system of FIG. 17 may include functionality to present raw or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, for example, data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, for example, by obtaining data from a data attribute within the data object that identifies the data object type. Then, the GUI may determine any rules designated for displaying that data object type, for example, rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The previous description of functions presents only a few examples of functions performed by the computing system of FIG. 17. Other functions may be performed using one or more embodiments of the disclosure.

CONCLUSION

The in-Memory Random CDT Sampler solves the problem of random sampling from a given distribution. In applications such as post-quantum cryptography and homomorphic encryption, random samples from a given distribution such as Gaussian distribution, binomial distribution and so on, are required. Traditional approaches suffer from high latency and energy and area budget, as well as threaten from side-channel attacks.

The in-Memory Random CDT Sampler makes use of in-memory computation to parallelize the sampling. CDT method is combined with the nature of range-matching content-addressable memory to eliminate requirements of memory read/write and serial external arithmetic. Indeed, this is the world's first computation-in-memory sampler that makes use of completely new architecture and custom circuits to accomplish sampling task. No previous ASIC or FPGA works have done similar things.

The sampler cell, peripheral and random masking are customize designed to optimize the CDT sampling method and outperform all other existing sampling methods. Furthermore, the in-Memory Random CDT Sampler is also flexible and can be reconfigured for different range and precision. The in-Memory Random CDT Sampler also makes use of random masking to flatten the energy consumption to defend against side-channel attacks.

Statistically, the in-Memory Random CDT Sampler may achieve 1 sample/cycle throughput as well as state-of-the-art area requirements and more than 100 times energy saving compared with existing technology.

Additional applications of the in-Memory Random CDT Sampler may include machine learning techniques such as Bayesian Neural Network, Gibbs Sampling, Particle Filter and Markov-Chain Monte Carlo techniques.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements, if an ordering exists.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, assuming, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the invention defined by the recitations of claims. Consequently, the description in this specification is provided only for the purpose of explaining examples, and should by no means be construed to limit the invention according to the present invention in any way.

The above examples and modified examples may be combined with each other, and various features of these examples may be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for generating a random sample of an arbitrary distribution comprising:
   precomputing a cumulative distribution table (CDT) of the distribution;
   storing the CDT in an array of range matching content-addressable memory (CAM) cells in ascending or descending orders;
   inputting data through a search line (SL);
   comparing the input data against stored data in the CDT using the array of range matching CAM cells;
   when the input data match the stored data, turning on all pass gates that are controlled by logic gates and shorting a match line (ML) among a plurality of ML from a most significant bit (MSB) to a least significant bit (LSB); and determining a range matching result on the ML, and outputting data points corresponding to an index of a matched row in CDT,
   when the input data do not exactly match the stored data, determining an interval of stored data that the input data falls into, and outputting the data points corresponding to the interval.

2. The method of claim 1, when the input data do not exactly match the stored data, the method further comprising: determining a value of a ML among a plurality of MLs by a mismatched MSB; and within the mismatched MSB, driving the ML to a value determined by the comparison between input data and stored data at this bit position.

3. The method of claim 1, wherein each range matching CAM cell comprises a metal oxide semiconductor field-effect transistor (MOSFET) that is controlled by an inverter.

4. The method of claim 2, wherein when the input data do not exactly match the stored data, the value of the ML is generated by disconnecting the ML and driving the ML to the SL within the mismatched MSB.

5. The method of claim 1,
wherein when the input data are smaller than or equal to the stored data, the range matching result will be a first value, and
wherein when the input data are greater than the stored data, the range matching result will be a second value that is different from the first value.

6. The method of claim 1, further comprising dividing the array of CAM cells into pipelined segments,
wherein each segment comprises cells, column peripherals and row peripherals.

7. The method of claim 6, further comprising generating an enabling signal for a segment when a previous segment has an exact match,
wherein only an enabled row of the segment performs matching in the segment, and disabled rows will pass results from previous segments through multiplexers and registers.

8. The method of claim 6, wherein the plurality of MLs used in the pipelined segments are differential MLs.

9. The method of claim 6, wherein a size of each segment is determined based on a precision, a range, and energy optimizations.

10. The method of claim 1, further comprising providing row-wise power gating and column-wise power gating,
wherein a plurality of row enable switches is inserted to each cell to enable or disable a search.

11. The method of claim 10, further comprising disabling an initial enable signal of unused rows in a first segment to achieve row-wise power gating to reduce the search.

12. The method of claim 10, wherein the row-power gating configures a sampling precision, and the column-power gating configures a sampling range.

13. The method of claim 1, further comprising applying multiple steps of Gaussian convolution to the input data to enlarge a sampling range.

14. The method of claim 6, further comprising applying a random masking scheme to each segment.

15. The method of claim 14, wherein the random masking scheme comprises a temporal random mask with a programmable maximum to activate unused rows to obfuscate power signatures.

16. A device for an in-memory cumulative distribution table (CDT) based random sampler comprising:
an array of content addressable memory (CAM) cells that performs CDT-based random number sampling,
a plurality of metal oxide semiconductor field-effect transistors (MOSFETs),
a 9-Transistor cell with one additional MOSFET that is controlled by an inverter,
wherein the device further comprises control logic configured to precompute a cumulative distribution table (CDT) of the distribution and store the CDT in the array of range-matching CAM cells in ascending or descending order;
wherein the device is configured to input data through a search line (SL) and compare the input data against stored data in the CDT using the array of range-matching CAM cells;
wherein, when the input data match the stored data, the device turns on all pass gates that are controlled by logic gates and shorts a match line (ML) among a plurality of MLs from a most significant bit (MSB) to a least significant bit (LSB), determines a range-matching result on the ML, and outputs data points corresponding to an index of the matched row in the CDT; and
wherein, when the input data do not exactly match the stored data, the device determines an interval of stored data that the input data falls into and outputs the data points corresponding to that interval.

* * * * *